Patented June 30, 1936

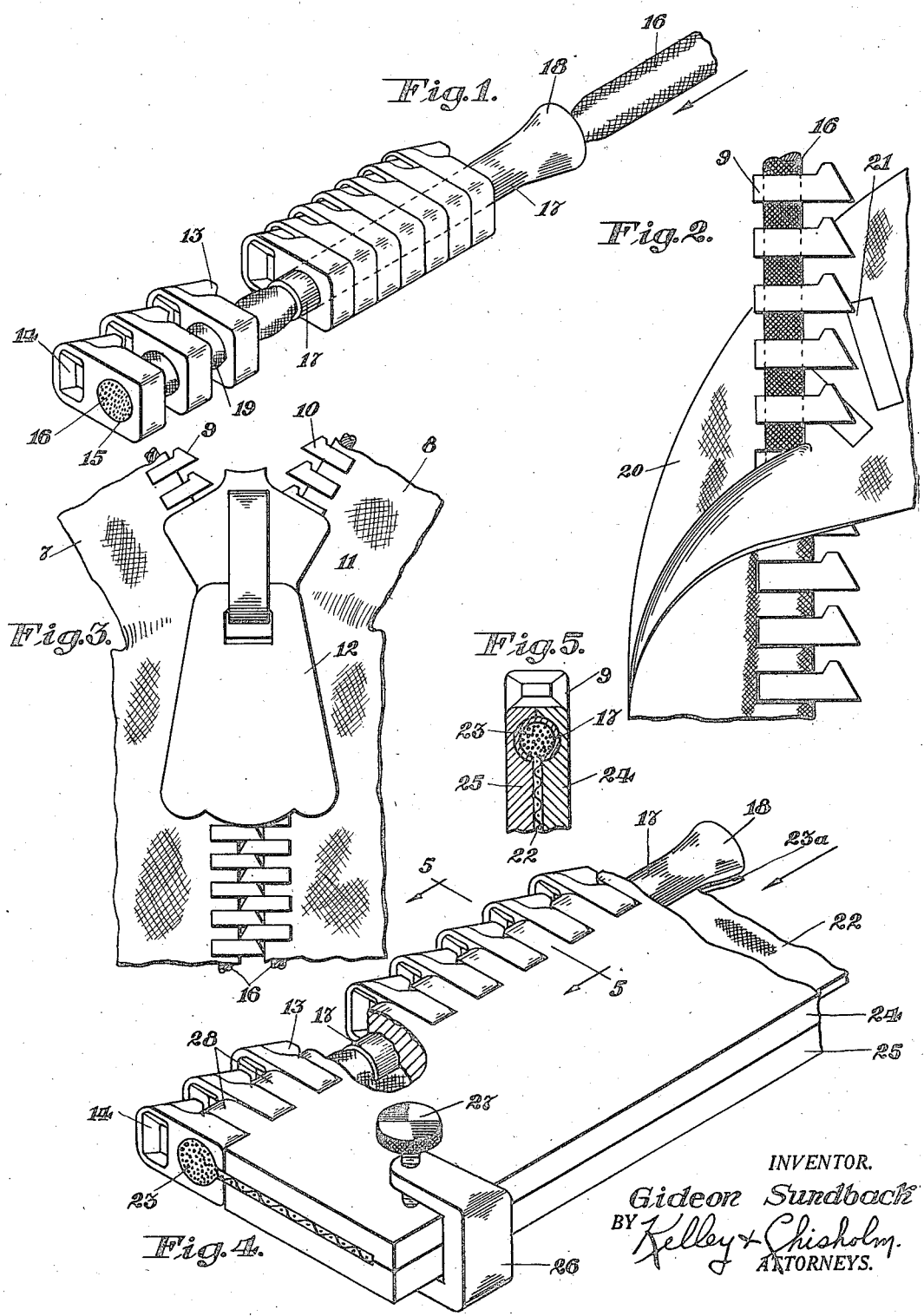
June 30, 1936. G. SUNDBACK 2,045,884
APPARATUS AND METHOD FOR ASSEMBLING SEPARABLE INTERLOCKING FASTENERS
Filed July 10, 1933
INVENTOR.
Gideon Sundback
BY Kelley & Chisholm.
ATTORNEYS.

2,045,884

UNITED STATES PATENT OFFICE 2,045,884

APPARATUS AND METHOD FOR ASSEMBLING SEPARABLE INTERLOCKING FASTENERS

Gideon Sundback, Meadville, Pa., assignor to Hookless Fastener Company, Meadville, Pa., a corporation of Pennsylvania Application July 10, 1933, Serial No. 679,692

5 Claims. (Cl. 18—1)

This invention relates to separable interlocking fasteners of the type having cooperating series of uniformly spaced members on flexible supports such as fabric tapes.

An object of the invention is to provide a suitable means for assembling individual fastener members on a flexible support without substantial distortion of the fastener members.

A further object of the invention is to provide an improved method and apparatus for assembling fastener members firmly and accurately on a flexible support without requiring the use of cements or analogous materials.

The invention is particularly useful in assembling non-metallic fastener members on fabric tapes. Such fastener members may be made of plastic materials such as hard rubber, Pyralin, Bakelite, etc.

Fastener members for separable interlocking fasteners may be formed, molded or cut to shape from the desired material and the particular shape illustrated forms no part of the present invention. It will be understood that my invention is adaptable to various types of interlocking members.

In the accompanying drawing I have shown for purposes of illustration two embodiments which my invention may assume in practice. In this drawing:

Fig. 1 illustrates one embodiment of the assembling operation;

Fig. 2 illustrates the assembling of the fastener members with a tape;

Fig. 3 is a general view of a complete fastener of the separable interlocking type;

Fig. 4 illustrates a modified form of the assembling operation; and

Fig. 5 is a cross-section on line 5—5 of Fig. 4.

Referring to Fig. 3 the fastener comprises generally a pair of flexible supports herein, fabric tapes, 7, 8 having attached thereto in uniformly spaced relation a series of fastener members 9, 10 which are brought together and interlocked by means of a slider 11, actuated by a pull tab 12. Each of the fastener members has interlocking means in the form of a projection 13 on one side and a recess 14 on the opposite side. In Fig. 1 the fastener members are provided with openings 15 for receiving the supporting cord 16.

The fastener members are nested together as indicated at the upper right hand portion of Fig. 1 with the openings in alignment and are threaded over a hollow compression member such as the tube 17, which has a bell mouth portion 18, and a cylindrical portion of extended length depending on the desired length of fastener to be made. The cord 16 is normally larger than the openings 15 and when pulled through the compression member 17 by force, the diameter is reduced.

The fastener members are fed from the collection one by one off the end of the tube 17 and on to the cord 16. When the compression is released on the cord, it will press against the sides of the opening 16, and swell up between the fastener members as indicated at 19. Thus the fastener members are held firmly in place not only by friction, but also by being partially embedded in the cord. To complete a fastener stringer, it is necessary to have a tape 20 with a series of apertures 21, which is assembled with the cord and fastener members by passing the fastener members through the apertures and folding the tape around the cord as shown in Fig. 2.

If desired the method can be applied to assemble the fastener members to a cord edge tape. In Fig. 4 the tape is designated 22 and the cord edge 23. The same type of compression member is used except that it is necessary to have a slot 23—a extending throughout its length to accommodate the flat part of the tape. In view of the slot it may be better to strengthen the compression member by outside means. For this purpose I have illustrated a rough form of clamping device comprising plates 24, 25 held together by an arm 26 and screw 27. The plates have spaced apart fingers 28 which are suitably grooved to fit around the tube 17. In this case the fastener members are preferably inserted in the slots between the fingers 28 where they are held by friction or other suitable means. The clamping device may be of the same length as the length of the fastener to be made and in making a fastener, it is merely necessary to pull the tape into position, remove the compression member 17, and the clamps 24.

While I have shown and described in this application two embodiments which my invention may assume in practice, it will be understood that these embodiments are merely for the purposes of illustration and description and that various other forms may be devised within the scope of my invention as defined in the appended claims.

What I claim as my invention is:

1. In the art of making separable fastener stringers of the class described, the method of attaching the fastener members to a flexible support in uniformly spaced relation wherein said fastener members have support receiving recesses which are narrower than the thickness of said support, which includes compressing said support sufficiently to enable it to pass into said recesses, feeding fastener members onto said compressed support at uniformly spaced intervals, and then releasing the compression to permit said support to press against the sides of said recesses and swell between the fastener members.

2. In the art of manufacturing separable interlocking fasteners of the class described, the method of attaching fastener members to a support in uniformly spaced relation comprising collecting a series of fastener members with support receiving recesses in alignment, guiding a compressed supporting member through said aligned recesses, feeding the fastener members from said collection on to said support at uniformly spaced intervals and releasing the compression on said support to permit the same to press against the sides of said recesses and swell between the fastener members.

3. In the art of manufacturing separable interlocking fasteners of the class described, collecting a series of fastener members on a hollow member, said hollow member extending through openings in said fastener members, guiding a flexible string through the hollow of said member, and feeding said fastener members one by one from said hollow member on to said support at uniformly spaced intervals.

4. In the art of manufacturing separable interlocking fasteners of the class described, collecting a series of fastener members on to a hollow tube, feeding a cord through said tube which is normally larger than the diameter of said tube whereby said cord is compressed, and simultaneously feeding said fastener members from the end of said tube one by one on to the support at uniformly spaced intervals whereby the compression on said cord is released to permit the same to press against said fastener member.

5. Apparatus for use in assembling separable fasteners of the class described which comprises a compression and guide tube having a bell mouth end and a uniform guide portion, said tube having a longitudinally extending slot, and a clamping member having spaced apart fingers adapted to embrace said tube to prevent expansion of the same.

GIDEON SUNDBACK.